United States Patent [19]

Ishima

[11] Patent Number: 5,101,281
[45] Date of Patent: Mar. 31, 1992

[54] AUTOMATIC GAIN CONTROL CIRCUIT OF IMAGE READING APPARATUS

[75] Inventor: Kazumi Ishima, Kashiwa, Japan

[73] Assignee: Ricoh Company, Ltd., Tokyo, Japan

[21] Appl. No.: 651,470

[22] Filed: Aug. 1, 1990

[30] Foreign Application Priority Data

Aug. 5, 1989 [JP] Japan ............................. 1-92368[U]
Nov. 28, 1989 [JP] Japan ............................. 1-308050
May 18, 1990 [JP] Japan ............................. 2-128851

[51] Int. Cl.$^5$ ............................................. H04N 1/40
[52] U.S. Cl. ................................... 358/446; 358/461; 358/464; 358/475
[58] Field of Search ............... 358/446, 461, 464, 475, 358/468, 163, 168; 382/50, 54

[56] References Cited

U.S. PATENT DOCUMENTS

| 4,133,008 | 1/1979 | Tisue ..................... | 358/446 |
| 4,408,231 | 10/1983 | Bushaw et al. ............ | 358/446 |
| 4,523,229 | 6/1988 | Kanmoto .................. | 358/461 |
| 4,723,174 | 2/1988 | Mishikawa et al. ......... | 358/446 |

FOREIGN PATENT DOCUMENTS

63-52568 3/1988 Japan.

*Primary Examiner*—Edward L. Coles, Sr.
*Attorney, Agent, or Firm*—Oblon, Spivak, McClelland, Maier & Neustadt

[57] ABSTRACT

An automatic gain control circuit in which a first image signal from an image reading apparatus is amplified by a variable gain amplifier with a gain being automatically adjusted. The automatic gain control circuit comprises a gain adjusting part for automatically adjusting the gain of the variable gain amplifier with a white signal of a white reference part of the first image signal to supply a second image signal from the variable gain amplifier, and a pseudo white signal inputting part for inputting a pseudo white signal to the gain adjusting part before the image reading apparatus starts an image reading, the pseudo white signal being at a predetermined level approximately equal to that of the white signal of the first image signal, the first image signal being switched by the pseudo white signal inputting part with the pseudo white signal only at timings in synchronism with the inputting of the pseudo white signal to the gain adjusting part.

10 Claims, 8 Drawing Sheets

AUTOMATIC GAIN CONTROL CIRCUIT OF IMAGE READING APPARATUS

BACKGROUND OF THE INVENTION

The present invention generally relates to automatic gain control circuits, and more particularly to an automatic gain control circuit of an image reading apparatus.

Figure 1A:
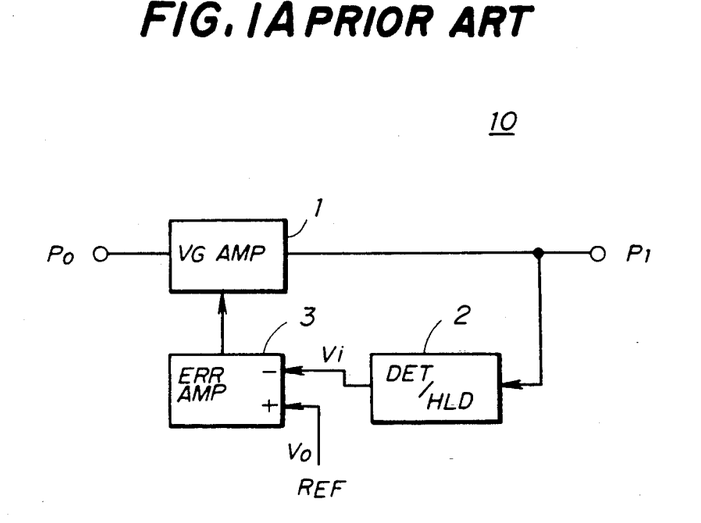
FIG. 1A is a block diagram showing a conventional automatic gain control circuit.
Figure 1B:
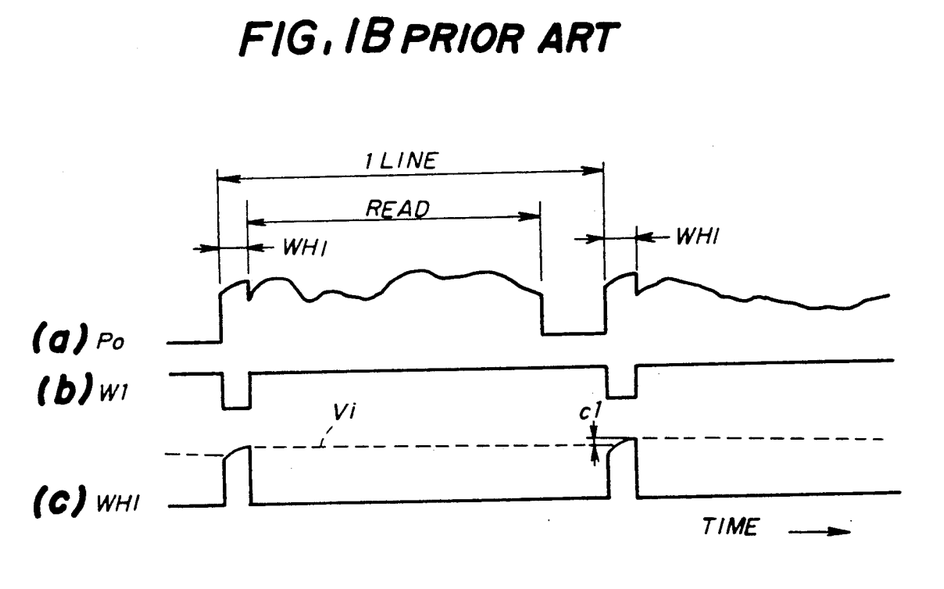
FIGS. 1B and 1C are timing charts for explaining an operation of the conventional automatic gain control circuit.

In a conventional image reading apparatus, a light reflected on a subject copy during a scanning of a light emitted from a light source is received by a light receiving part of the conventional image reading apparatus. In the light receiving part, the reflected light from the subject copy is photoelectrically converted repeatedly for each scanning line to supply an image signal. The image signal is amplified with an image signal gain being automatically adjusted by an automatic gain control circuit. FIGS. 1A and 1B respectively show a conventional automatic gain control circuit 10 and a timing chart for explaining an operation of this conventional automatic gain control circuit 10. This automatic gain control circuit 10 generally has a variable gain amplifier 1, a white signal detect/hold circuit 2 and an error amplifier 3. And, there is provided a white reference plate which is placed outside the range of an effective reading of each scanning line for the subject copy by the image reading apparatus. The scanning of a light emitted from a light source is repeatedly made on the white reference plate during the ON state of the light source for each scan. This scan is called a main scan, and this main scan is made in a main scanning direction, or the emitted light is scanned in a direction from left to right or vice versa with respect to the subject copy to be read by the image reading apparatus. The light is also scanned repeatedly in a direction from top to bottom with respect to the subject copy for each scan. This scan is called a sub scan, and this scan is made in a sub scanning direction. The image signal supplied from the light receiving part for each scan is represented, for example, as an image signal wave shown in FIG. 1B, which is given during an effective reading period within one line scanning period. At the beginning portion of the one line scanning period prior to the start of the image signal wave, a waveform of a white signal WHI as shown in FIG. 1B (a) appears. And, the image signal $P_0$ from the light receiving part is amplified by the variable gain amplifier 1, and the white signal given from the variable gain amplifier 1 is detected by the white signal detect/hold circuit 2, and a holding of the image signal is made. An output signal of the detect/hold circuit 2 is compared with a predetermined reference signal by the error amplifier 3, and with a resulting error signal represented by an error or difference between the reference signal voltage Vo and the output signal voltage Vi of the detect/hold circuit 2, the amplification by the variable gain amplifier 1 is automatically adjusted. Even with varying quantities of the light supplied from the light source, it is possible for the variable gain amplifier 1 to supply a substantially constant level of the image signal $P_1$. To ensure a longer useful life of the light source, the light source is turned OFF when an image reading is not performed. For this time period for which the light source is turned OFF, no white signal is supplied from the light receiving part and the output signal Vi of the detect/hold circuit 2 becomes zero voltage, while the gain of the variable gain amplifier 1 is at the maximum level. The output signal Vi of the detect/hold circuit 2 inherently shows a distortion, that is also called a sag, as shown with cl of FIG. 1B (c). This distortion causes varying gains of the detect/hold circuit 2, which may often worsen the accuracy of the image signal $P_1$ outputted from the variable gain amplifier 1. To avoid this, the detect/hold circuit 2 has a holding circuit part showing an extremely great time constant when compared to a time period of one line scanning of the image reading apparatus.

Japanese Published Patent Application No. 52568/1988 discloses a conventional image reading apparatus. This image reading apparatus comprises an original fixation surface having a reference reflector plate, a light source emitting a light that scans an original on the original fixation surface, the reference reflector plate being placed to face the same surface that the original faces, a sensor for sensing the quantities of a light reflected on the original on the original fixation surface and of a light reflected on the reference reflector plate, and a control unit for controlling the quantity of the light emitted from the light source responsive to an output signal of the sensor so as to obtain a substantially constant emission of the light source. This conventional image reading apparatus employs a fluorescent lamp as the light source. The quantity of light emitted from a fluorescent lamp generally is difficult to control in the entire range of reading the original, and this causes difficulty to obtain a stable image signal level. And the provision of a complicated control mechanism for obtaining a continuously stable level of the image signal suitable for practical use will result in a high cost of manufacturing the image reading apparatus.

Figure 1C:
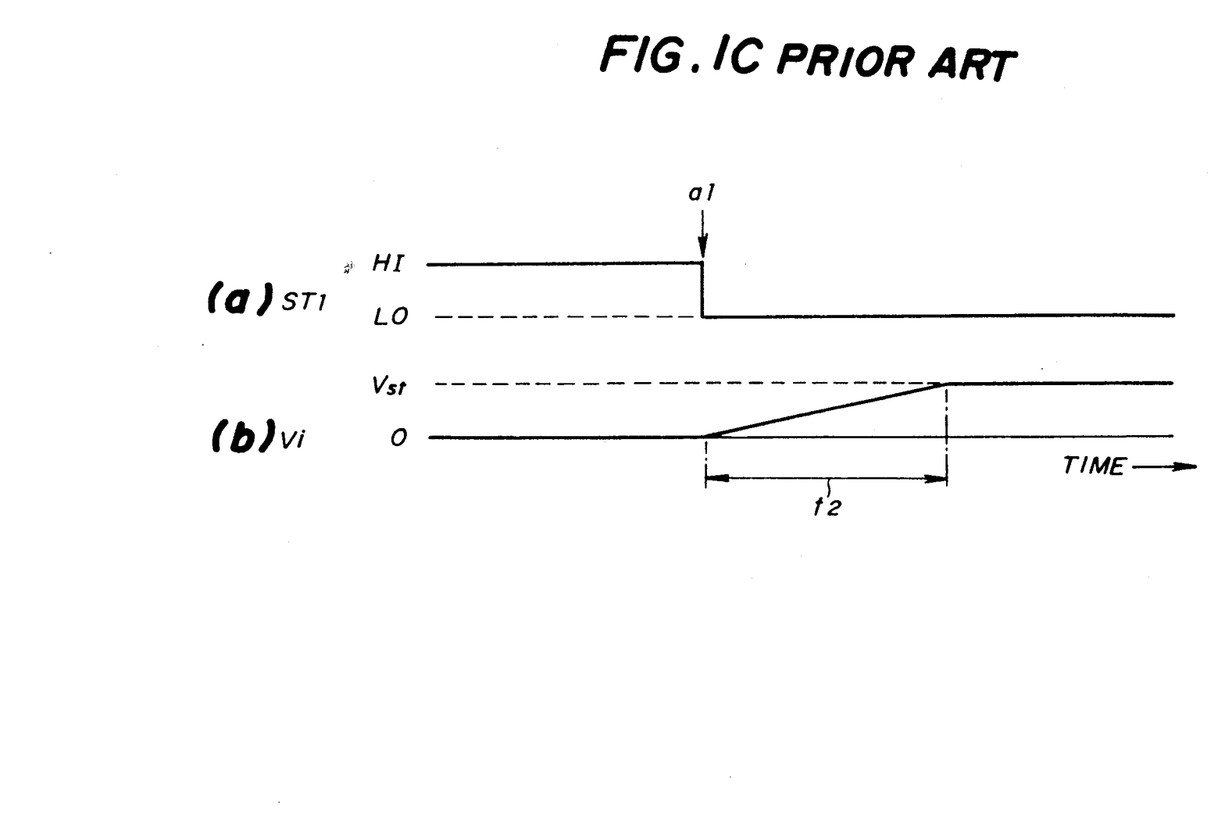

In the above described automatic gain control circuit 10, the white signal detect/hold circuit 2 has the holding circuit part having a significantly large time constant when compared to the time period of a single line reading. From a condition in which the light source is turned OFF and the output of the detect/hold circuit 2 is equal to zero voltage, the image reading of the subject copy for each scanning line is started with the turning ON of the light source immediately when a reading start set signal ST1 changes from a high level HI to a low level LO, as indicated by al of FIG. 1C (a). Before the reading is started, however, a significant time period $t_2$ is required for the output signal Vi of the detect/hold circuit 2 until it reaches a stable voltage level Vst starting from zero voltage, as shown in FIG. 1C (b). It actually takes several seconds or several ten seconds for the image signal $P_1$ from the variable gain amplifier 1 to reach a stable level. Therefore, the image reading apparatus must unnecessarily wait for such a time period $t_2$ before it starts the reading operation. In addition, an attempt for improving the accuracy of the image signal level outputted from the variable gain amplifier 1 by reducing a distortion in the output signal of the detect/hold circuit 2 will make the waiting time between the turning ON of the light source and the starting of the reading operation longer than that of the above described case.

SUMMARY OF THE INVENTION

Accordingly, it is a general object of the present invention to provide a novel and useful automatic gain control circuit in which the above described problems are eliminated.

Another and more specific object of the present invention is to provide an automatic gain control circuit which comprises a gain adjusting part for automatically adjusting a gain of a variable gain amplifier with a white signal of a white reference part of a first image signal from an image reading apparatus to supply a second image signal from the variable gain amplifier, and a pseudo white signal inputting part for inputting a pseudo white signal to the gain adjusting part before the image reading apparatus starts an image reading, the pseudo white signal being at a predetermined level approximately equal to that of the white signal of the first image signal, the first image signal being switched by the pseudo white signal inputting part with the pseudo white signal only at timings in synchronism with the inputting of the pseudo white signal to the gain adjusting part. According to the present invention, it is possible to reach a stable level of the image signal for a shorter period of time after the light source is turned ON, allowing the waiting time between the turning ON of the light source and the start of an image reading operation to be shortened.

Still another object of the present invention is to provide an automatic gain control circuit which comprises a gain adjusting part for automatically adjusting a gain of a variable gain amplifier with a white signal of a white reference part of a first image signal from an image reading apparatus to supply a second image signal from the variable gain amplifier, and a pseudo white signal superposing part for superposing a pseudo white signal over the first image signal to supply the first image signal including the superposed pseudo white signal thereof to the gain adjusting part before the image reading apparatus starts an image reading, the pseudo white signal having a predetermined level approximately equal to that of the white signal of the first image signal. According to the present invention, it is possible to reach a stable level of the image signal for a shorter period of time after the light source is turned ON, allowing the waiting time between the turning ON of the light source and the start of an image reading operation to be shortened.

Other objects and further features of the present invention will be apparent from the following detailed description when read in conjunction with the accompanying drawings.

DESCRIPTION OF THE PREFERRED EMBODIMENTS

First, a description will be given of an embodiment of an automatic gain control circuit according to the present invention, by referring to FIGS. 2A through 2C.

Figure 2A:
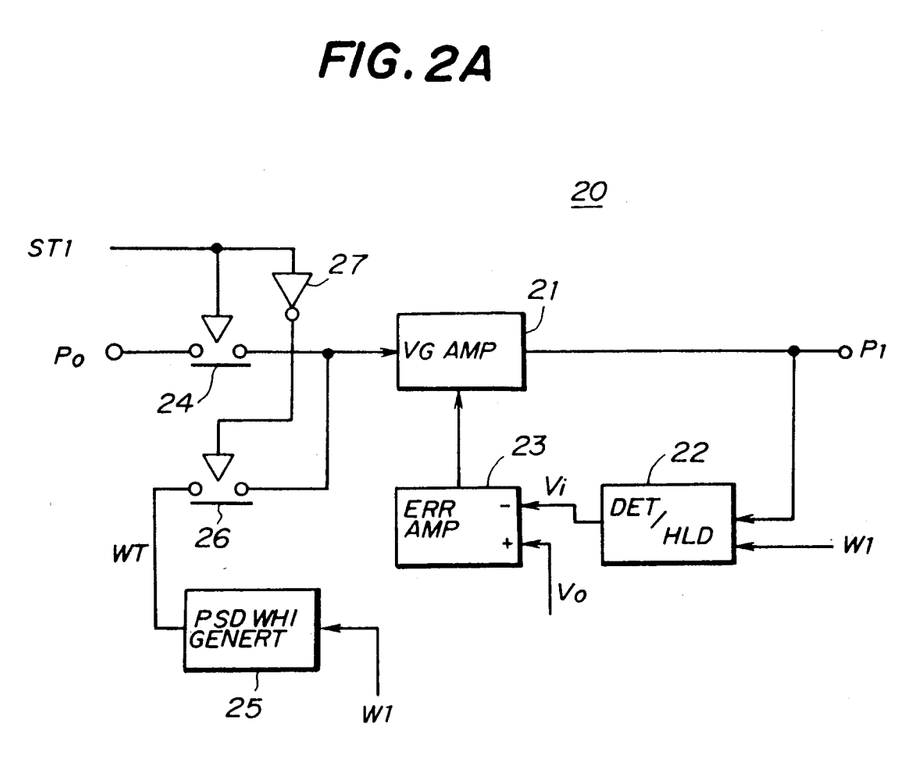
FIG. 2A is a block diagram showing an embodiment of an automatic gain control circuit according to the present invention.

An image signal supplied from a light receiving part of an image reading apparatus is amplified with a gain being automatically controlled by an automatic gain control circuit 20 as shown in FIG. 2A. A scanning of a light emitted from a light source of the image reading apparatus is repeatedly made for each scanning line of a subject copy in the main scanning direction and in the sub scanning direction. The light receiving part of the image reading apparatus receives a light reflected back from the subject copy, which is placed, for example, on an original fixation plate of a printer, when the light from the light source repeatedly scans the subject copy. The light receiving part photoelectrically converts the received light so as to supply an image signal to the automatic gain control circuit 20. And, as in the case of the conventional automatic gain control circuit 10, there is provided a white reference plate outside an effective reading range in the present embodiment. The scanning of the light from the light source is made also with respect to this white reference plate for each scan so as to include a reflected light in the above described image signal. By the light receiving part, the reflected light is similarly photoelectrically converted to a white signal constituting a white reference part of the image signal.

The automatic gain control circuit 20, as shown in FIG. 2A, comprises an auto gain control part and a pseudo white signal inputting part. The auto gain control part generally has a variable gain amplifier 21, a detect/hold circuit 22 and an error amplifier 23. The pseudo white signal inputting part generally has first and second switches 24, 26, an inverter 27 and a pseudo white signal generator 25. The auto gain control part comprising the variable gain amplifier 21, the detect/hold circuit 22 and the error amplifier 23 is approximately the same as that of the conventional automatic gain control circuit 10, except that the detect/hold circuit 22 comprises a holding circuit part having a time constant much smaller than that of a holding circuit part of the conventional detect/hold circuit 2 as described above.

Next, a description will be given of an operation of the automatic gain control apparatus 20. An image signal from the light receiving part is supplied to the variable gain amplifier 21 via the first switch 24, and a pseudo white signal from the pseudo white signal generator 25 is supplied to the variable gain amplifier 21 via the second switch 26. The first and second switches 24, 26 are a so-called analog switch which is, for example, a semiconductor switch. When an input switching signal having a low level is inputted to the first switch 24, the first switch 24 is turned ON to supply the image signal to the variable gain amplifier 21. When the input switching signal having a high level is inputted to the second switch 26 via the inverter 27, the second switch 26 is turned ON to supply the pseudo white signal to the variable gain amplifier 21.

Figure 2B:
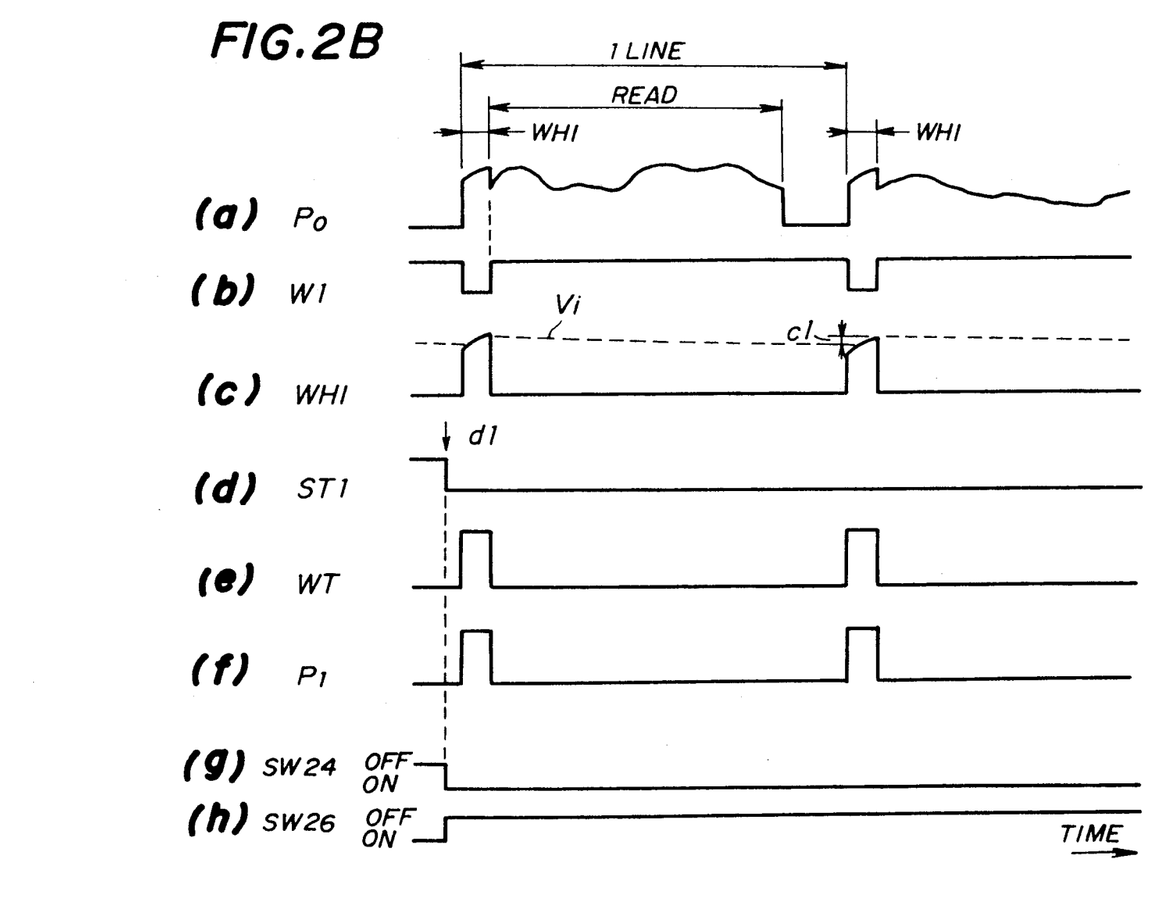
FIGS. 2B and 2C are timing charts for explaining an operation of the automatic gain control circuit.

The input switching signal generally includes a read start set signal ST1 as shown in FIG. 2B (d), and when a reading is started the read start set signal changes from a high level to a low level, which provides a read start set condition, as indicated by d1 of FIG. 2B (d). This change of the read start set signal ST1 to low level turns the first switch 24 ON and turns the second switch 26 OFF so that the image signal $P_0$ from the light receiving part passing through the first switch 24 is supplied to the variable gain amplifier 21. The image signal $P_0$ is amplified by the variable gain amplifier 21 to supply an image signal $P_1$. The image signal $P_0$ includes a white signal constituting a white reference part of the image signal, and this white signal lies outside the range of the image signal corresponding to an effective reading by the image reading apparatus. From the output signal Vi of the variable gain amplifier 21, the detect/hold circuit 22 detects the white signal at timings determined by a white signal timing signal as indicated in FIG. 2B (b), and holds a voltage level of the white signal in an analog form. An output signal of the detect/hold circuit 22 is approximately an ordinary d.c. output signal, which is then supplied to the error amplifier 23. From this error amplifier 23, an error voltage between a predetermined reference voltage Vo and the output signal Vi of the detect/hold circuit 22 is provided. With this error voltage supplied to the variable gain amplifier 21, the gain by the automatic gain control circuit 20 is adjusted so that the variable gain amplifier 21 provides a smaller gain than the previous gain when the white signal level becomes high, and the variable gain amplifier 21 supplies a greater gain than the previous gain when the white signal level becomes low.

At the same time as the read start set signal becomes a high level when the reading is completed, the light source is turned OFF, and both the image signal and the white signal become zero voltage. This read start set signal of high level turns the first switch 24 OFF and turns the second switch 26 ON, and a pseudo white signal from the pseudo white signal generator 25 is supplied to the variable gain amplifier 21 via the second switch 26. A white timing signal W1 as shown in FIG. 2B (b) is generated by a white timing signal generator (not shown) at the start of the reading and at a timing of non-reading for each scan, and a pseudo white signal WT as shown in FIG. 2B (e) is generated at timings in synchronism with the white timing signal W1 when being supplied to the pseudo white signal generator 25. This pseudo white signal is preset approximately at the same level as that of the above described white signal, and it is supplied to the detect/hold circuit 22 through the second switch 26 and the variable gain amplifier 21. The detect/hold circuit 22 detects only the pseudo white signal WT from the output signal $P_1$ of the variable gain amplifier 21 at timings of the white timing signal W1 being supplied to the detect/hold circuit 22, and holds the voltage level in an analog form. Thus, even when no image reading is made, the output signal of the detect/hold circuit 22 according to the present invention does not change to zero voltage and is kept approximately at the same level as that when the image reading is made. The auto gain control part which comprises the variable gain amplifier 21, the detect/hold circuit 22 and the error amplifier 23 continues to operate for automatic gain control in a stable condition regardless of whether the image reading is made or not.

Figure 2C:
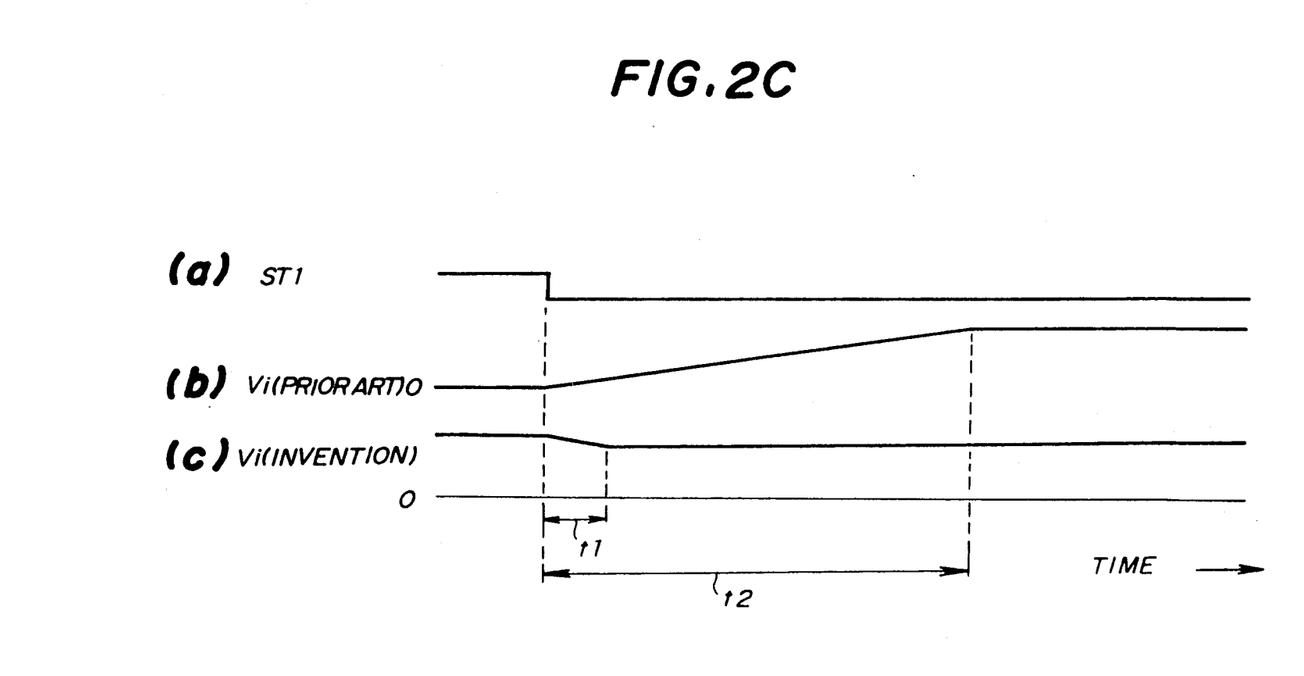

As shown in FIG. 2C, immediately after the read start set signal changes form a high level to a low level, the output voltage Vi of the detect/hold circuit 22 is already at a high level. With the read start set signal at a low level, the second switch 26 is turned OFF and the first switch 24 is turned ON so that the image signal from the above described light receiving part is supplied to the variable gain amplifier 21. At this time when the image signal $P_0$ from the light receiving part is inputted to the variable gain amplifier 21, the output signal Vi of the detect/hold circuit 22 reaches very soon a stable voltage level according to the white signal. Therefore, the image signal outputted from the variable gain amplifier 21 becomes stable very shortly. In the case of the conventional circuit 10, the waiting time between the turning ON of the light source and the start of the image reading operation is significantly long, as indicated in FIG. 2C (b), which is necessary for the detect/hold circuit 2 until the output signal Vi reaches a stable voltage level starting from zero voltage. In the case of the present invention, however, it is possible for the detect/hold circuit 22 to have an output signal at a stable voltage level for a remarkably short time period when compared with the case of the prior art circuit, as shown in FIG. 2C (c).

Figure 3A:
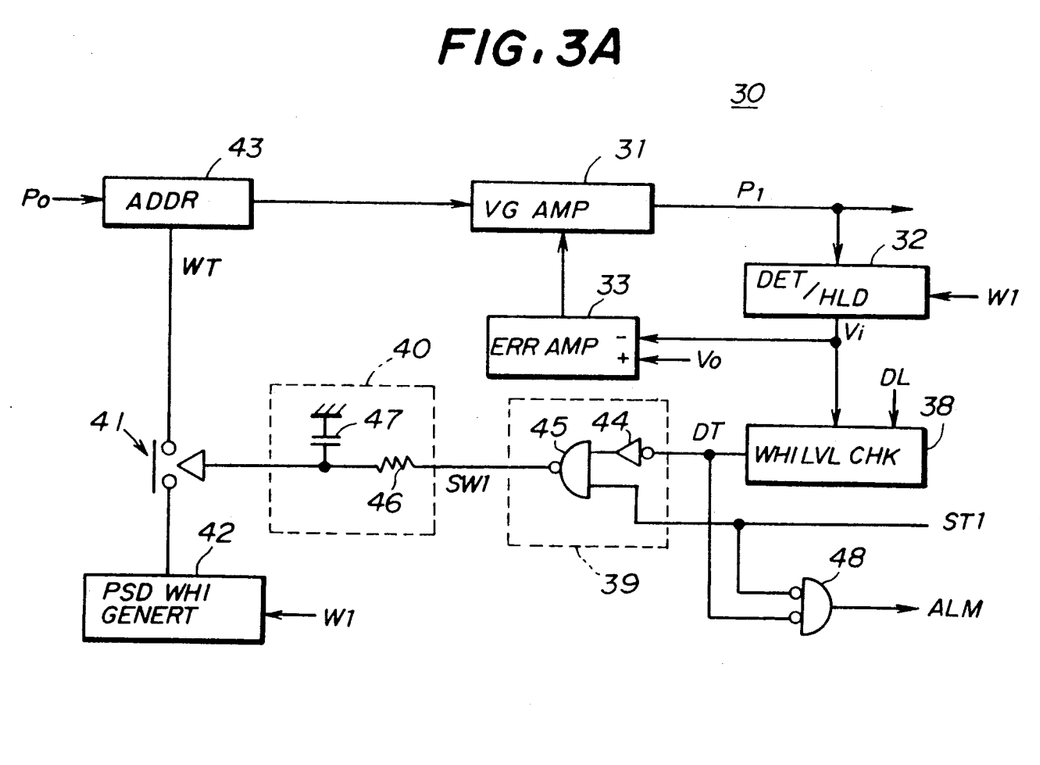
FIG. 3A is a block diagram showing another embodiment of an automatic gain control circuit according to the present invention.

FIG. 3A shows another embodiment of the automatic gain control circuit according to the present invention. A description of those parts in FIG. 3A which are the same as those corresponding parts in FIG. 2A will be omitted.

An automatic gain control circuit 30 shown in FIG. 3A comprises an auto gain control part and a pseudo white signal superposing part. The auto gain control part generally has a variable gain amplifier 31, a detect/hold circuit 32 and an error amplifier 33. The pseudo white signal superposing part generally has a white level check circuit 38, a logic circuit 39, a switch input part 40, a switch 41, a pseudo white signal generating circuit 42, and an adder circuit 43. Before the image reading is started, this pseudo white signal superposing part superposes a pseudo white signal, substantially at the same level as a white signal, over an image signal $P_0$ supplied from the light receiving part of the image reading apparatus, and the pseudo white signal superposing part supplies this image signal with the pseudo white signal superposed thereon t the auto gain control part. The logic circuit 39 comprises an inverter 44 and a NAND circuit 45, and the switch input part 40 comprises a resistor 46 and a capacitor 47. And a NAND circuit 48 is provided for outputting an alarm signal ALM by checking an output signal DT of the white level checking circuit 38 as well as a read start set signal ST1.

Next, a description will be given of an operation of the automatic gain control circuit 30 shown in FIG. 3A, by referring to FIGS. 3B through 3D.

Figure 3B:
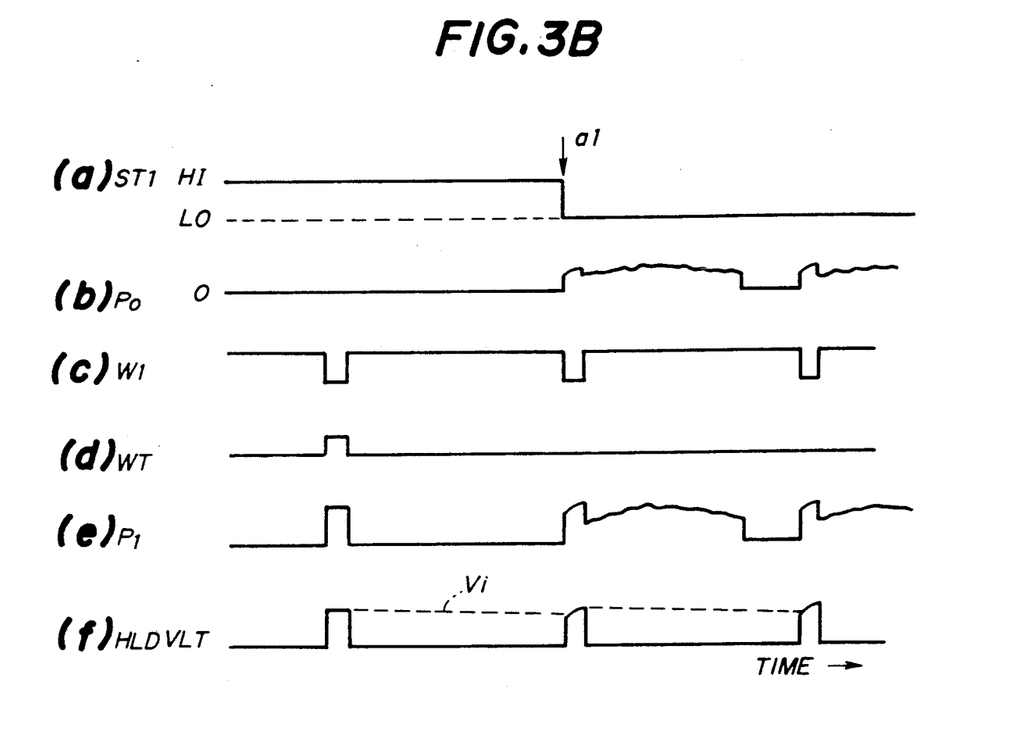
FIGS. 3B through 3D are timing charts for explaining an operation of the automatic gain control circuit.
Figure 3C:
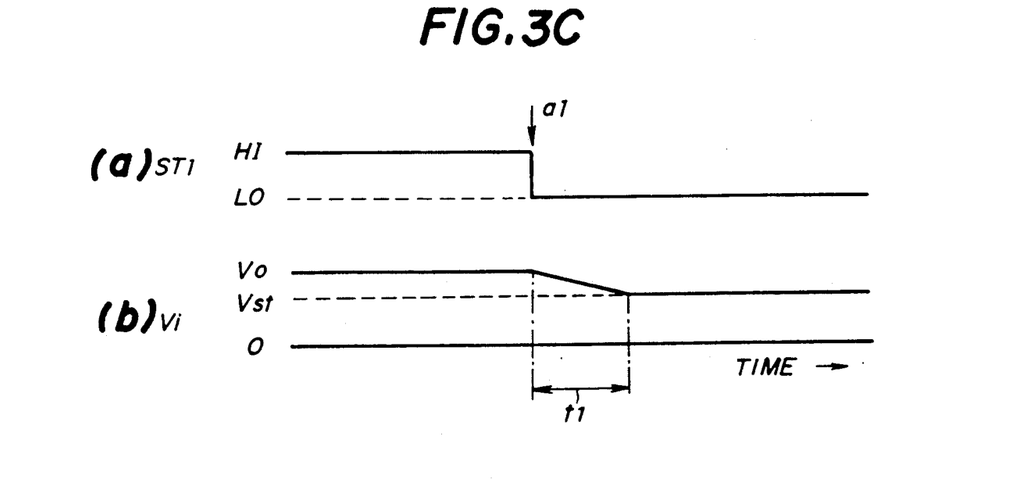
Figure 3D:
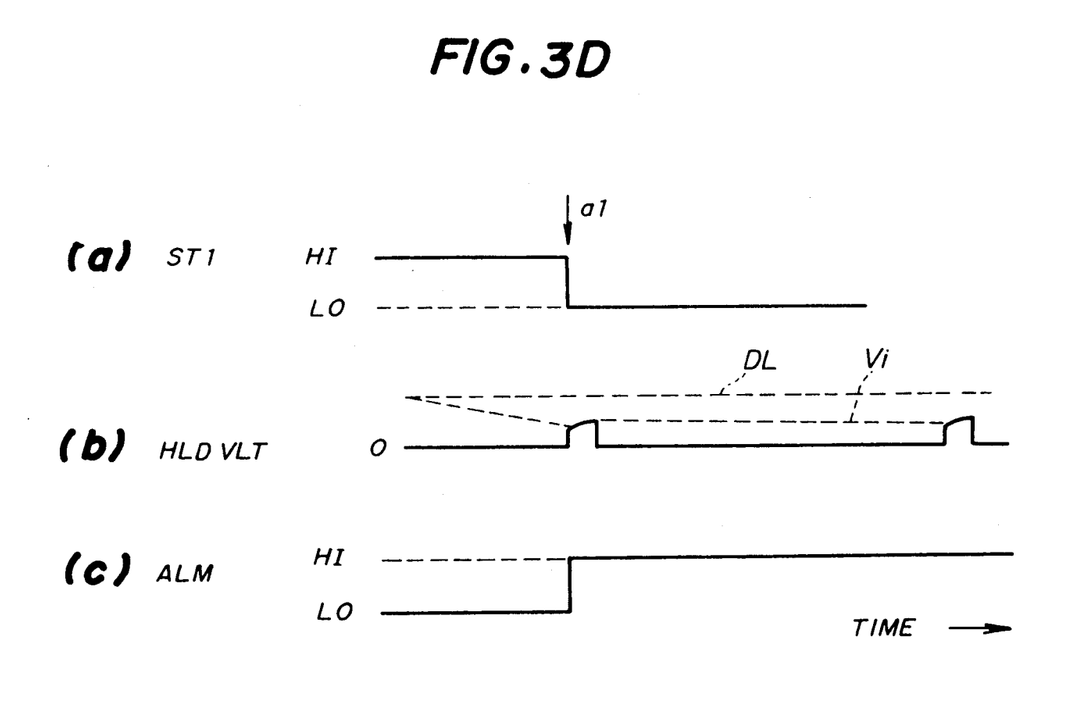

With the automatic gain control circuit 30 in an initial state prior to the start of an image reading, the read start set signal ST1 has a high level, the light source is turned OFF, and the image signal $P_0$ supplied from the above described light receiving part is at zero voltage, as indicated in FIG. 3B (a) and (b). This image signal $P_0$ through the adder circuit 43 is amplified by the variable gain amplifier 31 to supply an amplified image signal $P_1$. The detect/hold circuit 32 detects and holds only the white signal from the image signal $P_1$ supplied from the variable gain amplifier 31, as shown in FIG. 3B (e), at timings in synchronism with the white timing signal W1 when being supplied to the detect/hold circuit 32, as indicated in FIG. 3B (c). And the white level check circuit 38 checks whether the output signal Vi of the detect/hold circuit 32 is higher than a predetermined reference voltage DL or not. Initially, both the image signal $P_0$ from the light receiving part and the image signal $P_1$ from the variable gain amplifier 31 are equal to zero voltage, and the output signal Vi of the detect-/hold circuit 32 is negligibly small, and therefore the output signal DT of the white level checking circuit 38 is set to a low level. This output signal DT of the white level checking circuit 38 is supplied to the logic circuit 39. To the NAND circuit 45 of the logic circuit 39 before the start of the image reading, the output signal DT being inverted by the inverter 44 to the high level and the read start set signal ST1 (high level) ar inputted. Then the NAND circuit 45 supplies a switching signal SW1 at a low level to the switch input part 40. This switching signal SW1 (low level) is supplied to the switch 41 through the switch input part 40 so that the switch 41 is turned ON. On the other hand, a pseudo white signal WT is generated by the pseudo white signal generator 42 at timings in synchronism with a white timing signal W1 supplied from a white timing signal generator (not shown). This pseudo white signal WT is preset substantially at the same level as that of the white signal. The white timing signal W1 is repeatedly generated at timings of read starting and non-reading for each scan of the light emitted. The pseudo white signal WT as indicated in FIG. 3B (d) is supplied from the pseudo white signal generator 42 through the switch 41, and is inputted to the adder circuit 43. The adder circuit 43 then superposes this pseudo white signal WT over the image signal $P_0$. As a result, the image signal $P_1$ from the variable gain amplifier 31 contains the pseudo white signal in synchronism with the white timing signal W1, as shown in FIG. 3B (e), even when the image signal $P_0$ is at zero voltage prior to the start of the image reading. The pseudo white signal included in this image signal $P_1$ from the variable gain amplifier 31 is detected and held by the detect/hold circuit 32. As shown in FIG. 3B (f), the output signal Vi of the detect/hold circuit 32 does not become zero voltage, and is maintained approximately at the same level as after the reading is started. Hence, the operation of automatic gain control is performed stably by the auto gain control part comprising the variable gain amplifier 31, the detect/hold circuit 32 and the error amplifier 33.

When the read start set signal ST1 changes from the high level HI into the low level LO at the start of the image reading, as shown with al of FIG. 3B (a), the light source is turned ON to start the image reading. The image signal $P_0$ from the light receiving part starts having an image signal waveform owing to the image reading of the subject copy. At this instance, since the read start set signal ST1 becomes the low level LO, the output signal SW1 of the NAND circuit 45 changes to a high level, and the switch 41 is turned OFF. Accordingly, the pseudo white signal WT from the pseudo white signal generator 42 is not supplied to the adder circuit 43 during the image reading, and the image signal $P_0$ from the light receiving part passes through the adder circuit 43 without superposition and is supplied to the variable gain amplifier 31. This image signal $P_0$ is amplified by the variable gain amplifier 31 to supply the image signal $P_1$ as indicated in FIG. 3B (e). The detection and holding of the white signal from the image signal P is carried out by the detect/hold circuit 32 at timings in synchronism with the white timing signal W1 when being supplied to the detect/hold circuit 32 to result in the output signal Vi as indicated in FIG. 3B (f). The error amplifier 33 compares the output signal voltage Vi of the detect/hold circuit 32 with the predetermined reference voltage Vo, and supplies an error voltage corresponding to a difference between these voltages Vo and Vi to the variable gain amplifier 31. Accordingly, the gain is automatically adjusted, that is, the variable gain amplifier 31 is automatically controlled to provide a gain smaller than the previous gain when a white signal at an excessively high level is detected, and provide a gain larger than the previous gain when a white signal at an excessively low level is detected.

In the present embodiment, a NAND operation is conducted by the NAND circuit 48 between the read start set signal ST1 and the output signal Vi of the detect/hold circuit 32 (or, the output signal DT of the white level check circuit 38). Immediately after the read start set signal ST1 changes from the high level HI to the low level LO, as indicated by al of FIG. 3D (a), the image reading of the subject copy is started. If the output signal voltage Vi of the detect/hold circuit 32 is greater than the predetermined reference voltage DL and becomes a high level, then the alarm signal ALM from the NAND circuit 48 becomes low. But, if the output signal voltage Vi of the detect/hold circuit 32 is smaller than the predetermined reference voltage DL and becomes a low level, then the alarm signal ALM from the NAND circuit 48 becomes high. With this alarm signal ALM of high level, it is possible to activate, for example, a light emitting diode (LED) to turn the LED ON for providing an operator with error information about the operation of the image reading apparatus. In other words, when the output signal voltage Vi of the detect/hold circuit 32 is smaller than the predetermined reference voltage DL because no white signal is included in the image signal $P_0$, the LED is turned ON to inform the operator of any problem arising with the image reading apparatus, allowing the operator to interrupt the reading operation to avoid an erroneous reading of the image reading apparatus. In addition, it is possible to preset the reference voltage DL at such a level that is high enough to protect the light source from being deteriorated, so that the turning ON of the above described light emitting diode allows the operator to check whether the LED is the useful life. That is, if the LED remains turned OFF, there is no problem of the light source of the image reading apparatus, but once the LED is turned ON, it notices the operator about any problem arising with the light source of the image reading apparatus.

In addition, in the present embodiment, when the automatic gain control circuit is in a waiting condition prior to the start of image reading, the pseudo white signal WT is superposed over the image signal $P_1$, thus allowing the voltage of the image signal $P_1$ to reach a stable level for a shorter time period than the conventional automatic gain control circuit. As indicated in FIG. 3C (a) and (b), prior to the start of the image reading, the output signal voltage Vi of the detect/hold circuit 32 is maintained approximately at the same level as that by the white signal. Thus, the waiting time tl of the present invention, as shown in FIG. 3C (b), for which the output voltage Vi of the detect/hold circuit 32 reaches a stable level Vst beginning from the time of the start of the reading indicated by al of FIG. 3C (a), is quite shorter than the waiting time t2 of the prior art circuit as shown in FIG. 1C (b). For, in the case of the conventional automatic gain control circuit 2, the output signal voltage Vi of the detect/hold circuit 2 is necessary to start from zero voltage until it reaches the stable level Vst. Accordingly, it is possible for the present invention to make the level of the image signal $P_1$ stable for a remarkable short time period so that the image reading can be started very soon.

Further, the present invention is not limited to these embodiments, but various variations and modifications may be made without departing from the scope of the present invention.

What is claimed is:

1. An automatic gain control circuit in which a first image signal from an image reading apparatus is amplified by a variable gain amplifier with a gain being automatically adjusted, said automatic gain control circuit comprising:
    gain adjusting means for automatically adjusting the gain of the variable gain amplifier with a white signal of a white reference part of the first image signal to supply a second image signal from the variable gain amplifier; and
    pseudo white signal inputting means for inputting a pseudo white signal to said gain adjusting means before the image reading apparatus starts an image reading, said pseudo white signal being at a predetermined level approximately equal to that of the white signal of the first image signal, said first image signal being switched by said pseudo white signal inputting means with said pseudo white signal in synchronism with said inputting of the pseudo white signal to said gain adjusting means.

2. An automatic gain control circuit as claimed in claim 1, wherein said gain adjusting means comprises the variable gain amplifier, a white signal detect/hold circuit and an error amplifier, said second image signal from the variable gain amplifier being supplied to the white signal detect/hold circuit, the white signal detect/hold circuit supplying an output voltage to the error amplifier, the error amplifier comparing said output voltage with a reference voltage to provide the variable gain amplifier with an error between said output voltage and said reference voltage, allowing the gain of the variable amplifier to be automatically adjusted.

3. An automatic gain control circuit as claimed in claim 2, wherein said pseudo white signal inputting means comprises a first switch, a second switch, an inverter and a pseudo white signal generator, said first image signal being supplied to the variable gain amplifier through said first switch, said first switch being turned on and said second switch being turned off when a read start set signal having a low level is inputted to said first switch, said pseudo white signal generator generating the pseudo white signal which is supplied to the second switch, said second switch being turned on and said first switch being turned off when the read start set signal having a high level is inputted to said second switch through said inverter.

4. An automatic gain control circuit as claimed in claim 3, wherein said white signal detect/hold circuit carries out detection and holding of the pseudo white signal from the output signal of the variable gain amplifier at timings in synchronism with a first timing signal being supplied to said white signal detect/hold circuit.

5. An automatic gain control circuit in which a first image signal from an image reading apparatus is amplified by a variable gain amplifier with a gain being automatically adjusted, said automatic gain control circuit comprising:
    gain adjusting means for automatically adjusting the gain of the variable gain amplifier with a white signal of a white reference part of the first image signal to supply a second image signal from the variable gain amplifier; and
    pseudo white signal superposing means for superposing a pseudo white signal over the first image signal to supply the first image signal including the superposed pseudo white signal to said gain adjusting means before the image reading apparatus starts an image reading, said pseudo white signal having a predetermined level approximately equal to that of the white signal of the first image signal.

6. An automatic gain control circuit as claimed in claim 5, wherein said gain adjusting means comprises the variable gain amplifier, a white signal detect/hold circuit and an error amplifier, said second image signal from the variable gain amplifier being supplied to the white signal detect/hold circuit, the white signal detect/hold circuit supplying a first output voltage to the error amplifier, the error amplifier comparing said first output voltage with a first predetermined reference voltage to provide the variable gain amplifier with an error between said first output voltage and said first reference voltage, allowing the gain of the variable gain amplifier to be automatically adjusted.

7. An automatic gain control circuit as claimed in claim 6, wherein said pseudo white signal superposing means comprises a level check circuit, a logic circuit, a switch portion, a pseudo white signal generator and an adder circuit, said first image signal from the image reading apparatus being supplied to the variable gain amplifier through said adder circuit, said adder circuit superposing the pseudo white signal over the first image signal, said pseudo white signal being supplied by the pseudo white signal generator to the adder circuit through the switch portion at timings in synchronism with a first timing signal when being supplied to the pseudo white signal generator.

8. An automatic gain control circuit as claimed in claim 7, wherein the logic circuit comprises an inverter and a first NAND circuit and the switch portion comprises a switch, said first output signal of the white signal detect/hold circuit being checked by said level check circuit, by comparison with a second predetermined reference voltage, to supply a second output voltage to the first NAND circuit of the logic circuit through the inverter thereof, when a read start set signal is set at a high level prior to the start of the image reading, with said read start set signal at the high level and said second output voltage being inverted by the inverter to a high level, said logic circuit supplying a switching signal at a low voltage to the switch portion so that the switch is turned on to allow the pseudo white signal to be inputted to the adder circuit.

9. An automatic gain control circuit as claimed in claim 8, wherein said first output signal of the white signal detect/hold circuit becomes greater than said second predetermined reference voltage to allow the level check circuit to supply the second output voltage at high level to the first NAND circuit via the inverter when the read start set signal changes from high level to low level to start the image reading by the image reading apparatus, and with said read start set signal at low level and said second output voltage being inverted by the inverter to low level, said logic circuit supplying the switching signal at a high voltage to the switch portion so that the switch is turned off with no pseudo white signal being inputted to the adder circuit and the first image signal being inputted to the variable gain amplifier through the adder circuit.

10. An automatic gain control circuit as claimed in claim 9, wherein said automatic gain control circuit further comprises a second NAND circuit provided for generating an alarm signal when the second output voltage of the level check circuit is smaller than said second predetermined reference voltage and the read start set signal is low level.

* * * * *

UNITED STATES PATENT AND TRADEMARK OFFICE
CERTIFICATE OF CORRECTION

PATENT NO. : 5,101,281
DATED : March 31, 1992
INVENTOR(S) : Kazumi Ishima

It is certified that error appears in the above-identified patent and that said Letters Patent is hereby corrected as shown below:

On the Title page, item [21]
The Application Number is incorrect, should be, --561,470--.

Signed and Sealed this

Fifteenth Day of June, 1993

Attest:

MICHAEL K. KIRK

Attesting Officer

Acting Commissioner of Patents and Trademarks